Feb. 7, 1961 E. E. HELVEY 2,971,119

COMPUTING DEVICE

Filed March 8, 1954 4 Sheets-Sheet 1

INVENTOR.
EDWARD E. HELVEY
BY George Lipkin
Lee I. Huntzberger
ATTORNEYS

Feb. 7, 1961 E. E. HELVEY 2,971,119

COMPUTING DEVICE

Filed March 8, 1954 4 Sheets-Sheet 2

INVENTOR
EDWARD E. HELVEY
BY George Sipkin
Lee J. Huntzberger
ATTORNEYS

INVENTOR.
EDWARD E. HELVEY
BY George Lipkin
Lee J. Huntzberger
ATTORNEYS

INVENTOR.
EDWARD E. HELVEY
BY George Sipkin
Lee J. Huntzberger
ATTORNEYS

United States Patent Office 2,971,119

Patented Feb. 7, 1961

2,971,119

COMPUTING DEVICE

Edward E. Helvey, Clifton, N.J., assignor to the United States of America as represented by the Secretary of the Navy Filed Mar. 8, 1954, Ser. No. 414,922

1 Claim. (Cl. 315—23)

This invention relates to a computing device, and more particularly, to a computing device for providing a resultant which varies in proportion to two parameters. In facsimile systems the receiver is adjusted in proper relationship to the transmitter when the index of cooperation for the receiver and the transmitter are identical. Generally defined, the index of cooperation is proportional to the product of the total length of a scanning line by the number of scanning lines per unit length. Since the total number of scanning lines in a particular facsimile message is fixed, and since the index of cooperation at the transmitter and receiver are identical under proper operating conditions, recording a larger number of lines per unit length results in compressing the length of the message and also the width of the message since the total length of the scanning line is reduced in the same proportion. In effect, the index of cooperation provides the guide needed to maintain both linear dimensions of a facsimile recording at the same ratio as the corresponding linear dimensions of the transmitted message. In a facsimile system employing cathode ray tubes for purposes of recording, it is necessary to control the horizontal and vertical sweep circuits in accordance with the index of cooperation. The horizontal sweep frequency is made proportional to the number of lines per unit length.

Ordinarily it is necessary to make calculations to determine the sweep frequencies whenever either of the factors change. Where time is important in the operation of facsimile apparatus such as where a facsimile receiver is used for monitoring, this invention finds particular utility in that it provides a computing device which automatically adjusts for a known change or changes in one or two factors of three interrelated factors to produce the necessary change in the third factor without the necessity of performing calculations.

An object of this invention is to provide a computing device.

A further object is to provide a computing device for automatically obtaining a resultant function which function is proportional to two parameters.

A further object is to provide a computing device for constantly relating three variables in accordance with a known mathematical relationship.

A further object is to provide a computing device adapted for use in facsimile systems.

A further object is to provide a computing device for automatically relating index of cooperation lines per unit length, and the length of each line.

Other objects and many of the attendant advantages of this invention will be readily appreciated as the same becomes better understood by reference to the following detailed description when considered in connection with the accompanying drawings wherein.

Figure 1:
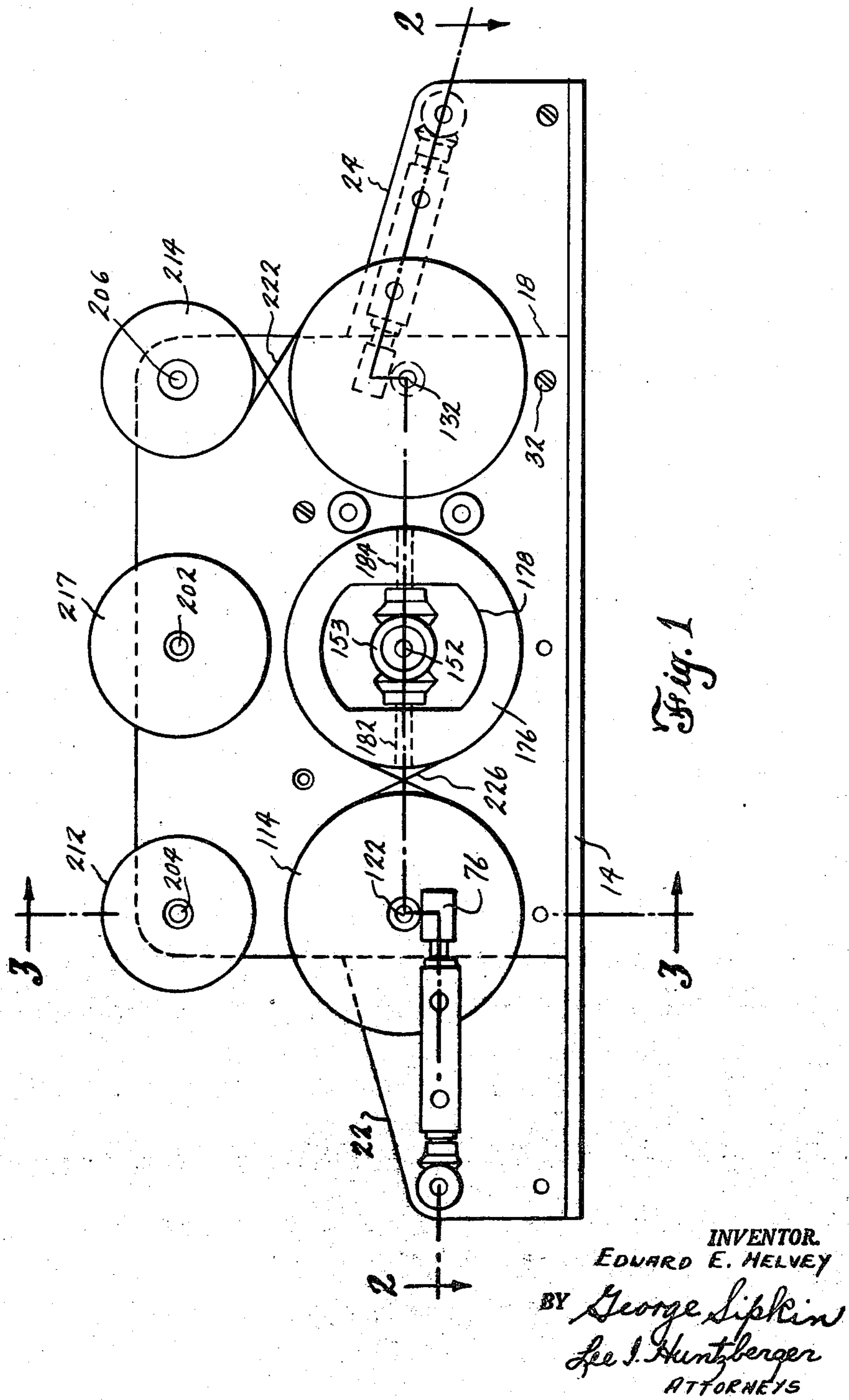
Fig. 1 is a front elevation of the computing device with parts removed.
Figure 2:
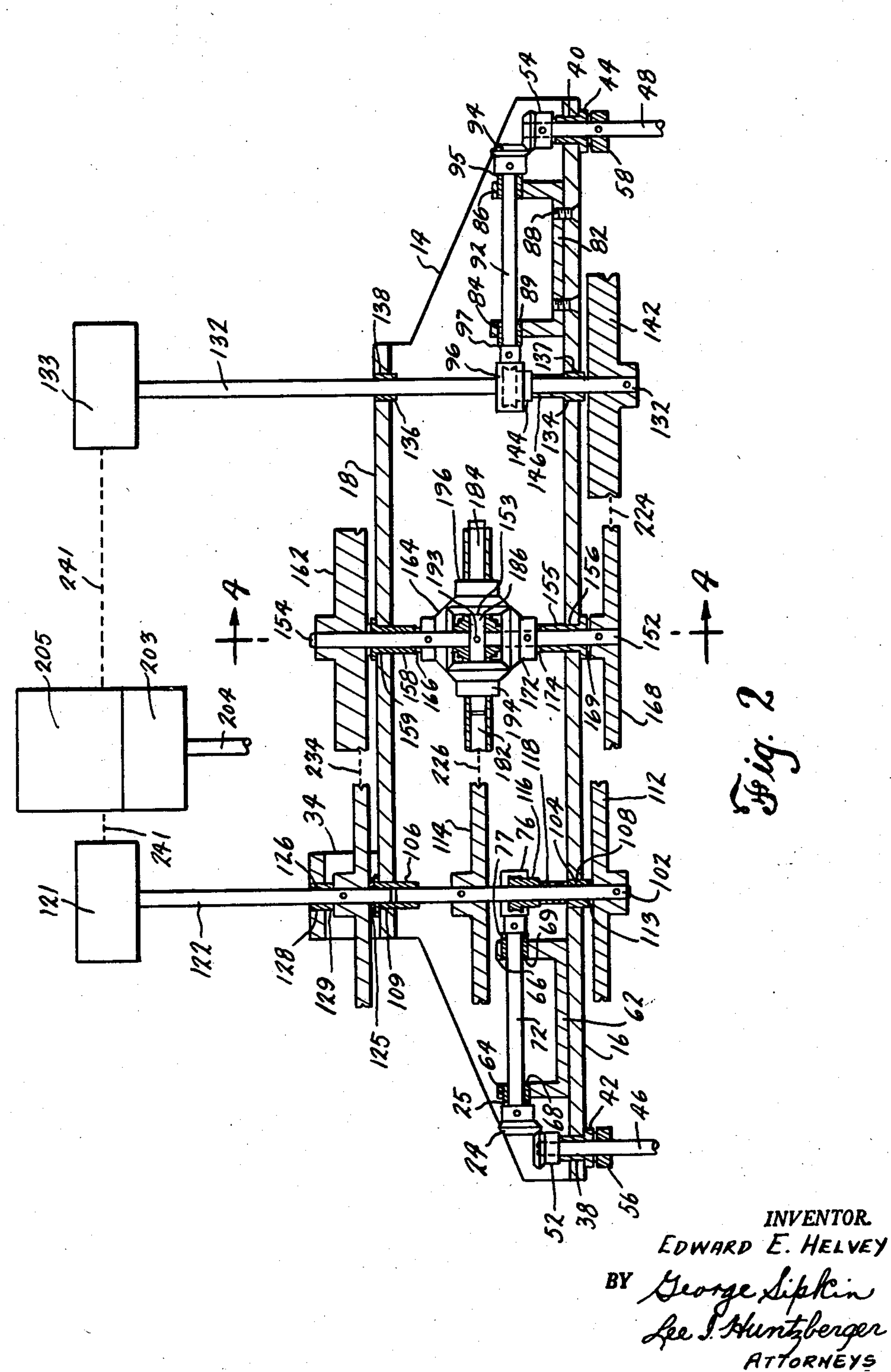
Fig. 2 is a section along line 2—2 of Fig. 1.
Figure 3:
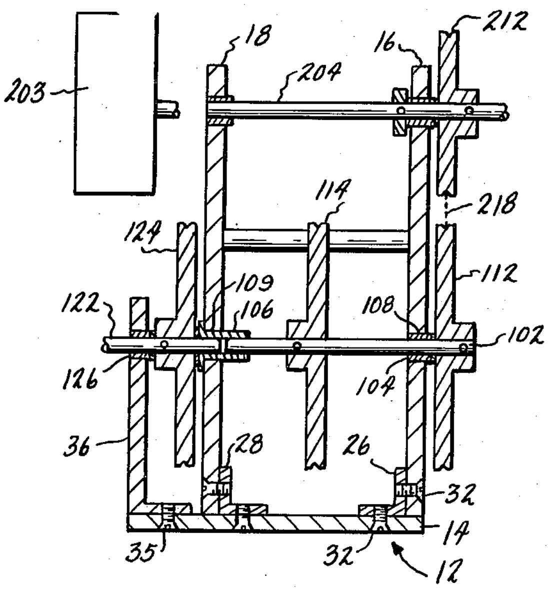
Fig. 3 is a section along line 3—3 of Fig. 1.
Figure 5:
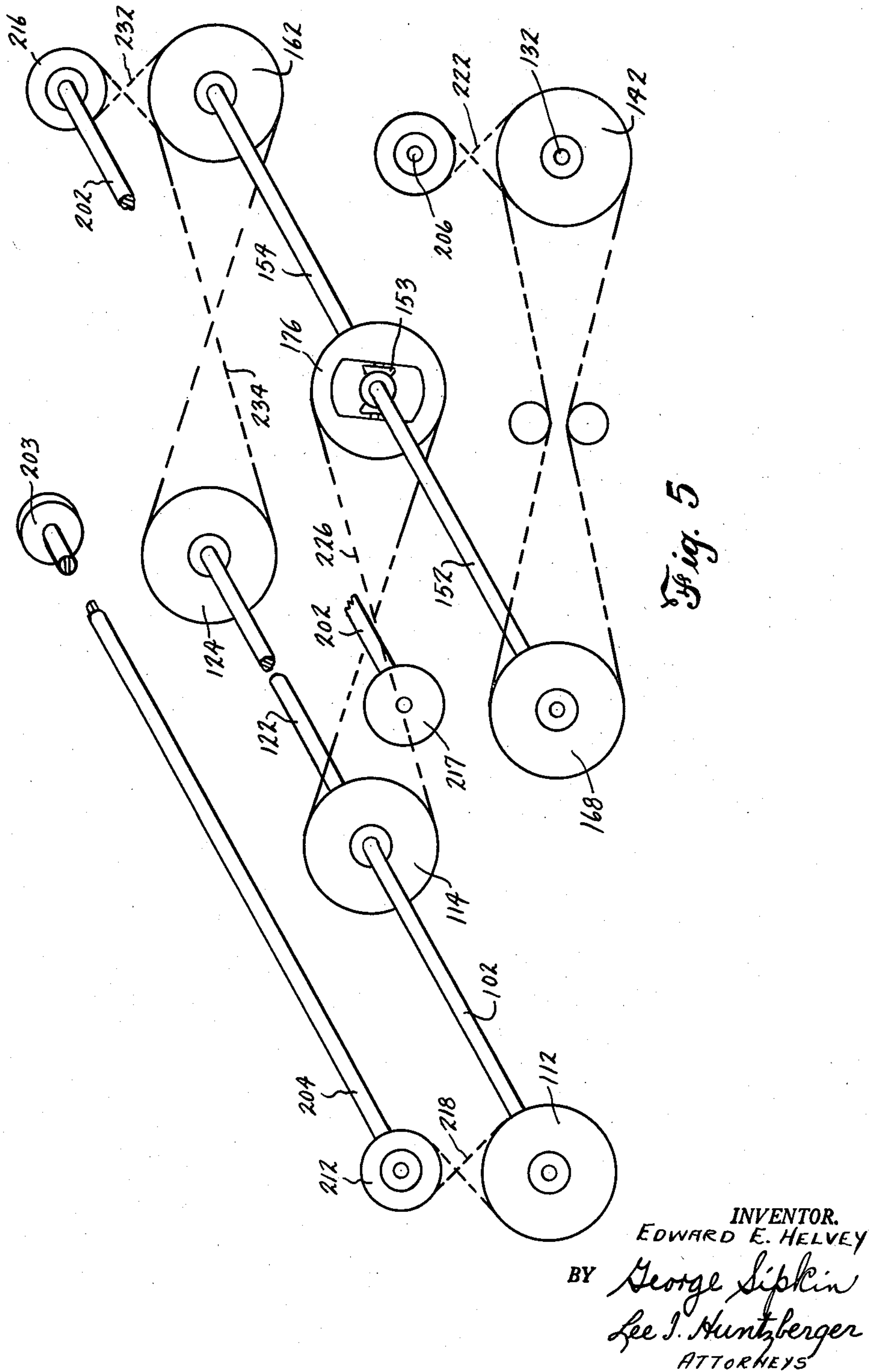
Fig. 5 is an isometric schematic of the invention.

As shown in the drawings, the control unit comprises a support 12 (Fig. 3). The support 12 includes a base plate 14 of uniform thickness. The shape in plan of the base plate 14 may be clearly seen in Fig. 2. Fixedly secured to the base plate 14 are a pair of spaced parallel supporting plates 16 and 18, oriented perpendicularly to the base plate 14. The back plate 18 is substantially rectangular. The front plate 16 is aligned with the back plate 18 as shown in Fig. 1 whereby peripheral portions along the top and side edges of both plates 16 and 18 are aligned. However, the front plate 16 includes in addition a pair of symmetrical oppositely extending portions 22 and 24. Both plates 16 and 18 are secured in place with respect to the base plate 14 by means of transversely extending angle bracers 26 and 28, respectively. Angle bracers 26 and 28 are fixed to the plates 16 and 18, respectively, and to the base plate 14 by means of flat head screws 32. The base plate 14 includes a projecting portion 34 which extends beyond the plate 18. Affixed to the projecting portion 34 of the base plate 14 by means of flat head screws 35 is an angle bracket 36.

Eight bearing receiving openings are formed in the front plate 16 symmetrically about a vertical center line of the plate 16. Suitable bearings are mounted in each of the openings. Mounted in the openings 38 and 40 (Figs. 1 and 2) formed near the opposite horizontal extremities of the front plate 16 are flanged bearings 42 and 44, respectively. Shafts 46 and 48 are rotatably supported by the bearings 42 and 44. Secured to corresponding ends of the shafts 46 and 48 by means of set screws or other conventional fastening means are bevel gears 52 and 54, respectively. When the shafts 46 and 48 are mounted in the bearings 42 and 44, respectively, they are secured by retaining collars 56 and 58 fixed to the shafts by means of any conventional fastening means. Free ends of shafts 46 and 48 extend forwardly to knobs, not shown. Secured to the inboard side of the plate 16, contiguous with the opening 38, is a U-shaped bracket 62. The legs of the U-shaped bracket 62 are formed with a pair of axially aligned openings 64 and 66, which axis is parallel to the base plate 14. A pair of bearings 68 and 69 are secured in the openings 64 and 66, respectively. Mounted for rotation within the bearings 68 and 69 is a shaft 72 to one end of which is secured a bevel gear 74 for proper meshing relationship with the bevel gear 52 and at 1:1 relationship thereto. Disposed between the bevel gear 74 and the bearing 64 is a thrust washer 75. Fixedly mounted on the shaft 72 at the end opposite to bevel gear 74 is a worm 76. Between the worm 76 and the bearing 69 there is disposed a thrust washer 77.

At the opposite end of the plate 16, a similar drive arrangement is shown associated with the bevel gear 54. The latter drive arrangement includes a U-shaped bracket 82, the legs of which are formed with a pair of axially aligned openings 84 and 86, the axis of which is parallel to the plate 16. The U-shaped bracket 82 is secured to the plate 16 by means of flat-head screws 88. Secured within the openings 84 and 86 are sleeve-bearings 89 and 90, respectively. Supported for rotation within the bearings 89 and 90 is a shaft 92 to one end of which is secured a bevel gear 94 positioned for meshing with the bevel gear 54 on the shaft 48 at a 1:1 ratio. A thrust washer 95 is disposed between the sleeve bearing 90 and the bevel gear 94. Secured to the opposite end of the shaft 92 is a worm 96. A thrust washer 97 is disposed between the worm 96 and the bearing 89. In the drive arrangement shown on the right of Fig. 1, the worm is disposed above the gear it meshes with whereas in the drive arrangement shown at the left of Fig. 1, the worm is below the gear it meshes with. By this arrangement, the same direction of rotation of shafts 46 and 48 produce the same direction of rotation in the corresponding elements driven thereby.

Associated with the driving arrangement shown at the left of Fig. 1, is a driven shaft 102. The driven shaft 102 is supported for rotation by the sleeve bearing 104 and the flanged sleeve bearing 106 secured within axially aligned openings 108 and 109, respectively, formed in the plates 16 and 18. One end of the shaft 102 terminates intermediate the ends of the flanged sleeve bearing 106. Secured to the opposite end of shaft 102 is a wire wheel 112 separated from the sleeve bearing 104 by means of a thrust washer 113. Intermediate the ends of the shaft 102 and fixedly secured thereto is a wire wheel 114. Between the wire wheels 112 and 114 and on the shaft 102 there is fixedly secured the gear 116 for meshing relationship with the worm 76. To prevent axial movement of the shaft 102, a spacing sleeve 118 is mounted on the shaft 102 between the worm gear 116 and the sleeve washer 104.

Axially aligned with the shaft 102 and rotatable relative thereto is a shaft 122. One end of the shaft 122 is rotatably supported within the flanged sleeve bearing 109 adjacent an end of the shaft 102. Secured to the shaft 122 is a wire wheel 124; shaft 122 extends beyond wire wheel 124 for coupling with a vertical oscillator 121. Disposed between the wire wheel 124 and the flange of the bearing 109 is a thrust washer 125. The shaft 122 is also supported within sleeve bearing 126, the latter being secured within the opening 128 formed in the bracket 36 and axially aligned with the sleeve 106 in the plate 18. A thrust washer 129 is disposed between the hub of the wire wheel 124 and the sleeve bearing 126.

The drive arrangement at the right-hand side of Fig. 1 is mechanically linked to the driven shaft 132, one end of which extends beyond the plate 18 for coupling to a horizontal oscillator 133. The driven shaft 132 is supported for rotation within the sleeve bearings 134 and 136, secured within the axially aligned openings 137 and 138 in the plates 16 and 18, respectively. Secured to one end of the shaft 132 is a double wire wheel 142. Additionally there is fixedly secured to the shaft 132 a gear 144 for meshing engagement with the worm 96. To prevent axial movement of the shaft 132 a spacing sleeve 146 is interposed between the gear 144 and the sleeve bearing 134.

Intermediate the axes of the shaft 102 and 132 and coplanar therewith is a pair of axially aligned shafts 152 and 154 connected by a differential device 153. The shaft 152 is mounted for rotation in the flanged sleeve bearing 155, the latter being secured within the opening 156 formed in the plate 16. The shaft 154 is mounted for rotation in the flanged sleeve bearing 158, the latter being secured within the opening 159 formed in the plate 18. Secured to one end of the shaft 154 is a double wire wheel 162. Secured to the opposite end of the shaft 154 is a bevel gear 164 spaced from the flanged sleeve bearing 158 by means of a thrust washer 166. The shaft 154 extends through the bevel gear 164 projecting slightly beyond. Secured to one end of the shaft 152 is a wire wheel 168. Wire wheel 168 is spaced from the flange of the sleeve bearing 155 by means of a thrust washer 169. Secured to the inner end of the shaft 152 is a bevel gear 172 spaced from the end of the sleeve bearing 155 by means of a thrust washer 174. The end of shaft 152 likewise extends beyond the bevel gear 172.

Mounted for rotation about adjacent ends of the axially aligned shafts 152 and 154 is a specially formed wire wheel 176. Specially formed wire wheel 176 (Fig. 1) is centrally cut out at 178 to provide a centrally formed opening bordered by a pair of opposed arcuate portions and a pair of opposed chordal portions. Axially aligned openings 182 and 184 are formed along a diameter of the wire wheel 176 and are so located that the said diameter bisects the chordal portions of the opening formed centrally of the wire wheel 176. Disposed for rotation within the axially aligned bores 182 and 184 is a rotatable shaft 186. A bearing member 192 (Fig. 2) is secured to the rotatable shaft 184 by a fastening means 193 and is rotatably mounted on the adjacent ends of the shafts 152 and 154. Mounted for rotation on the shaft 186 are a pair of opposed bevel gears 194 and 196 equal in size to each other and to the bevel gears 164 and 172. The assembled unit comprises a differential.

Figure 4:
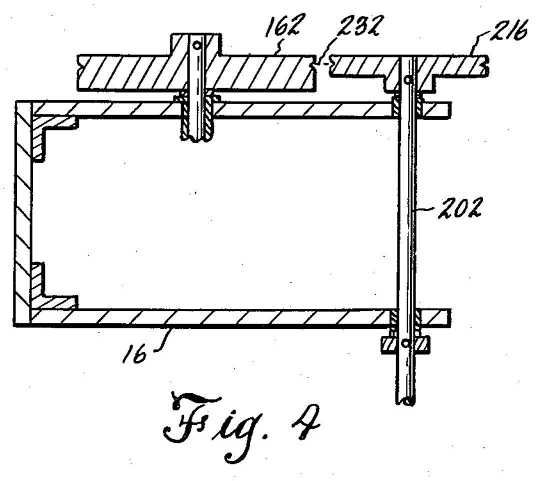
Fig. 4 is a section along line 4—4 of Fig. 2.

There is additionally provided three more shafts 202, 204, and 206, all of which are disposed in a plane parallel to the planes defined by the above-described shafts. The central shaft 202 is disposed in the same vertical plane as are the shafts 152 and 154. Correspondingly, the shaft 204 is disposed in the same vertical plane with the shaft 102 and the shaft 206 is disposed in the same vertical plane with the shaft 132. Secured to the shaft 204 outboard of the plate 16 is a wire wheel 212 and at the opposite end of shaft 204 is a potentiometer 203 to control the modulation needed on the positioning voltage of recording tube 205. A wire 218 couples the wire wheels 112 and 212. A wire 222 couples the wire wheels 142 and 214. Additionally, the wire wheel 142 is coupled to the wire wheel 168 by means of a wire 224. The wire wheel 114 on the shaft 102 is linked with the wire wheel 176 of the differential by means of a wire 226. The wire wheel 162 on the shaft 154 is linked to the wire wheel 216 by means of a wire 232 (Fig. 4) and is also linked to the wire wheel 124 on shaft 122 by means of a wire 234.

As shown in Fig. 2, recording tube 205, vertical oscillator 121, and horizontal oscillator 133, are electrically connected at 241 in conventional manner.

In operation, the shaft 122 is coupled to the vertical oscillator 121 of a facsimile receiver-recorder system. The shaft 132 is coupled to the horizontal oscillator 131 of the same facsimile receiver-recorder system. When the shaft 46 is manually operated and caused to rotate and at the same time the shaft 48 is held stationary, rotation of the shaft 46 causes rotation of the shaft 122 in a predetermined ratio due to the geared connection between shafts 46 and 72, the geared connection between shafts 72 and 102, the coupled wire wheels 114 and 176, the rotation of shaft 154 with the wire wheel 176, the coupled wire wheels 162 and 124, the latter being fixed to the shaft 122.

Rotation of shaft 46, while shaft 48 is held fixed, causes rotation of shaft 122 without affecting the position of shaft 132. Where shaft 122 is coupled to the vertical oscillator of a facsimile receiver-recorder and shaft 132 is coupled to the horizontal oscillator of a facsimile receiver-recorder the output frequency of the horizontal oscillator remains unchanged, whereas the output frequency of the vertical oscillator changes in proportion with the fraction of a revolution of the shaft 46. If angular rotation of the shaft 46 is calibrated in terms of index of cooperation, the output frequency of the vertical oscillator may be varied in proportion to the index of cooperation.

When the shaft 48 is caused to rotate while the shaft 46 is held fixed, both the shaft 132 and shaft 122 rotate through an angle which is proportional to the angle of rotation of the shaft 48. If the shafts 46 and 48 are rotated in the same direction at the same speed, output shaft 122 remains fixed while shaft 132 rotates through an angle proportional to the rotation of shaft 48.

Since the information that is made available with a particular facsimile message is the lines per minute and the index of cooperation, it is possible without making any calculation to set the horizontal and vertical oscillators of the facsimile receiver-recorder directly. For example, if the shaft 204 which rotates in direct proportion to the shaft 46 were connected at its forward end to a dial calibrated in units of index of cooperation, it would be possible to set the position of the shaft 46 to correspond to a selected index of cooperation. Correspondingly, if the shaft 206 were fixed at its front end to a dial, not shown, calibrated in lines per minute, it would be possible to set the position of the shaft 48 to correspond with the known value of lines per minute. The invention serves to combine both factors to provide the needed setting of horizontal and vertical oscillators. The device disclosed eliminates the need for computation. An additional dial, not shown, is adapted to be affixed to the front end of the shaft 202. This additional dial is coupled to the vertical oscillator for the purpose of providing a reading of the required film exposure.

Obviously many modifications and variations of the present invention are possible in the light of the above teachings. It is therefore to be understood that within the scope of the appended claim the invention may be practiced otherwise than as specifically described.

I claim:

In combination in a facsimile recorder; visual recording means including a recording cathode ray tube and horizontal and vertical deflection means for said cathode ray tube; an adjustable horizontal oscillator electrically connected to said horizontal deflection means for controlling line-by-line deflection across the face of said cathode ray tube; horizontal sweep width adjusting means electrically connected to said horizontal deflection means; first manually rotatable means, calibrated in terms of lines per unit time mechanically connected to said horizontal oscillator; a vertical oscillator electrically connected to said vertical deflection means for controlling lines per unit length on said cathode ray tube; rotatable adjusting means connected to said vertical oscillator; second manually rotatable means calibrated in terms of index of cooperation mechanically connected to said horizontal sweep width adjusting means; a differential having three relatively rotatable elements two of which are inputs and one of which is an output; means mechanically connecting one of the input rotatable elements of said differential and said index of cooperation calibrated manually rotatable means; means mechanically connecting another of the input elements of said differential and said lines per unit time calibrated manually rotatable means; and means mechanically connecting the output element of said differential and said vertical oscillator.

References Cited in the file of this patent

UNITED STATES PATENTS 2,679,550 Parker ---------------- Mar. 25, 1954